March 12, 1935. G. B. YALCH 1,994,205
WINDOW SCREEN STRUCTURE
Filed Nov. 7, 1933 2 Sheets-Sheet 1
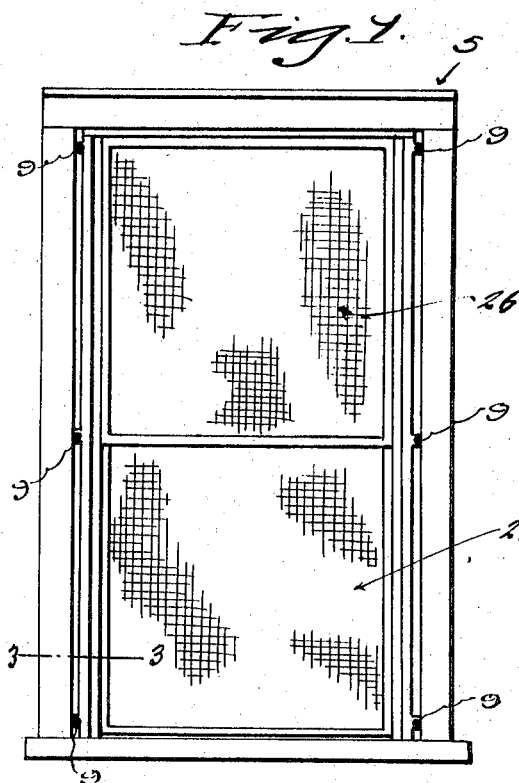
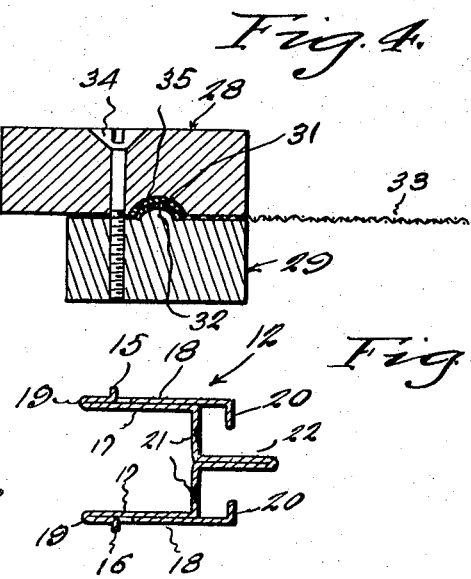
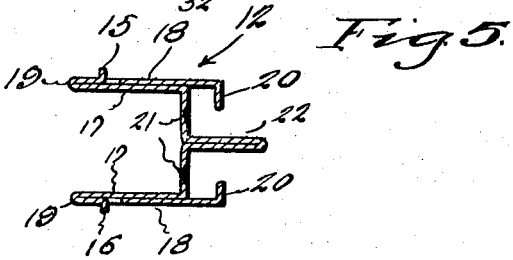
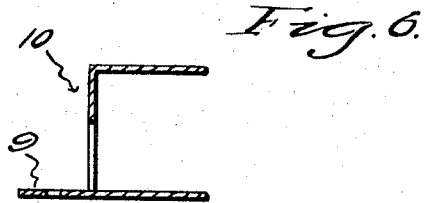
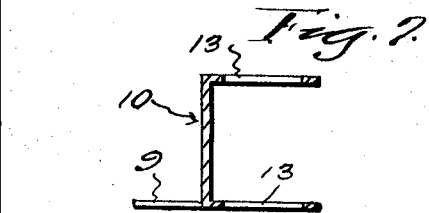
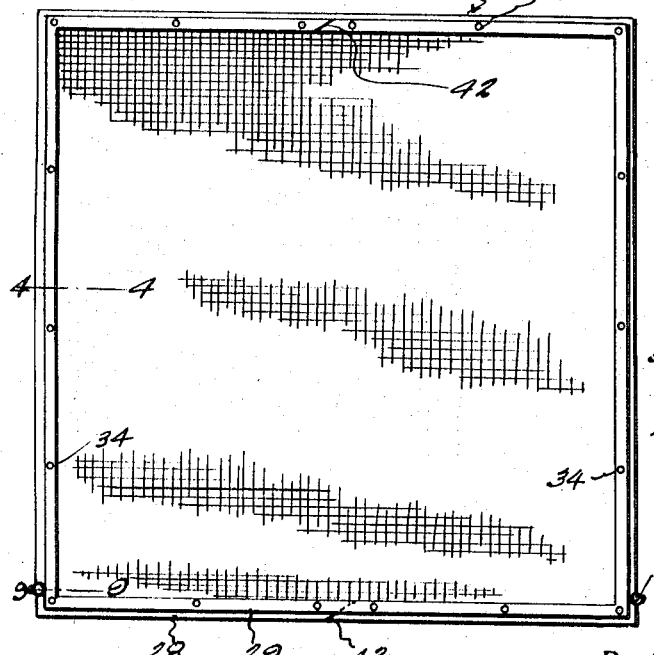
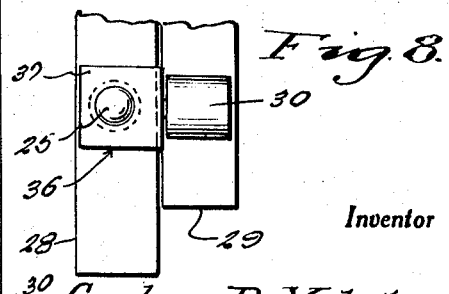
Inventor
Gustave B. Yalch
By Clarence A. O'Brien
Attorney March 12, 1935. G. B. YALCH 1,994,205
WINDOW SCREEN STRUCTURE
Filed Nov. 7, 1933 2 Sheets-Sheet 2
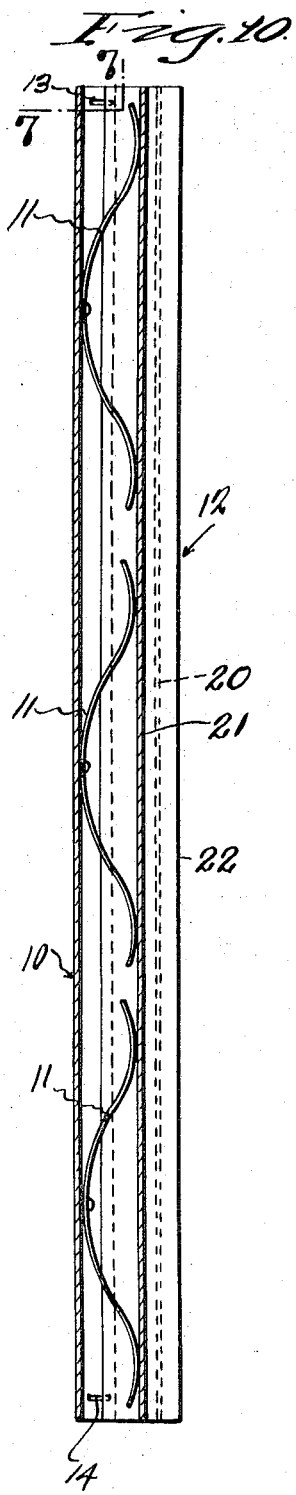
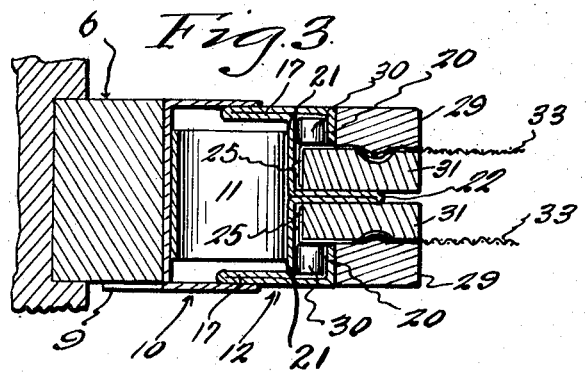
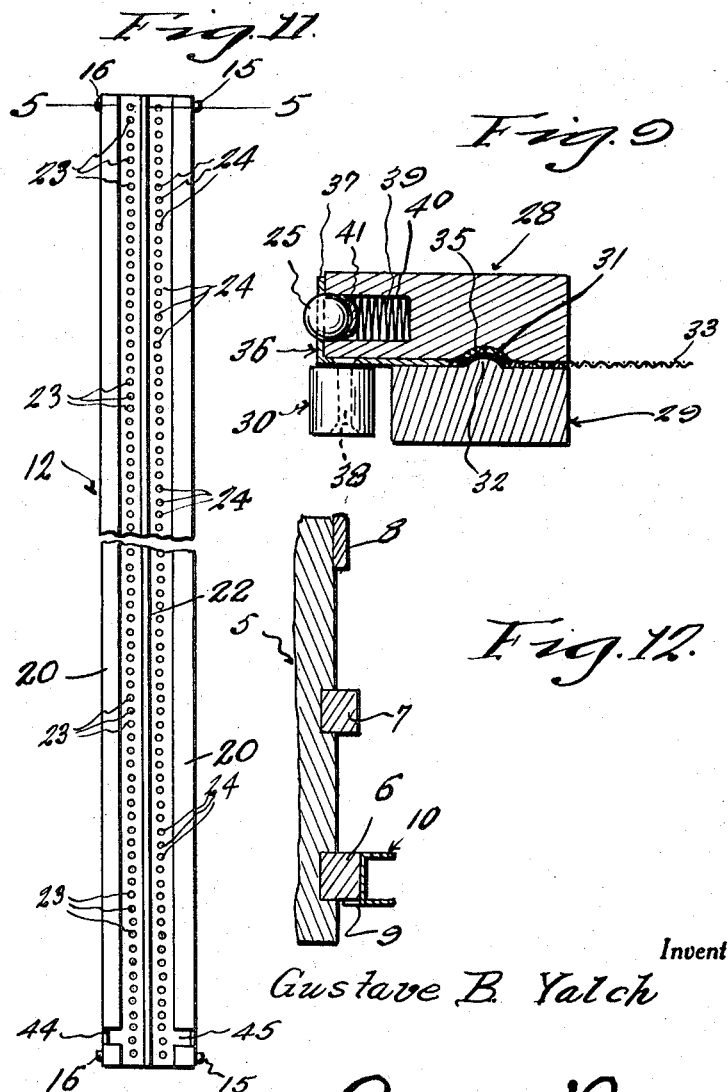
Inventor
Gustave B. Yalch
By Clarence A. O'Brien
Attorney Patented Mar. 12, 1935

1,994,205

UNITED STATES PATENT OFFICE 1,994,205

WINDOW SCREEN STRUCTURE

Gustave B. Yalch, Kew Gardens, N. Y.

Application November 7, 1933, Serial No. 697,054

3 Claims. (Cl. 156—14)

My invention relates generally to a screen structure for a window of a building or vehicle, and particularly to a double screen construction for such a window.

It is an important object of my invention to provide a structure of the class described above for use in different types of windows, and particularly for use in a casement type window, whereby an upper slide and a lower slide are provided, which are movable independently of each other and of the window sashes.

It is also an important object of my invention to provide a structure of the type indicated which adequately replaces the full sized wooden screens now widely carried in stock, and is cheap, easily manufactured, and very easily installed, and which occupies a minimum amount of space when installed.

Other objects and advantages of my invention will be apparent from a reading of the following description in connection with the drawings, wherein for purposes of illustration I have shown a preferred embodiment of my invention.

In the drawings:

Figure 1 is an elevational view of the outside of a casement window showing the screen structure of the invention installed.

Figure 2 is a side elevational view of one of the screens or slides.

Figure 3 is a horizontal sectional view through Figure 1 and taken approximately on the line 3—3.

Figure 4 is a horizontal sectional view taken through Figure 2 approximately on the line 4—4.

Figure 5 is a horizontal sectional view taken through Figure 11 approximately on the line 5—5.

Figure 6 is a horizontal sectional view through the stationary channel member.

Figure 7 is another horizontal sectional view taken through the upper part of Figure 10 approximately on the line 7—7.

Figure 8 is an elevational view of a portion of one of the screens or slides showing one of the rollers and spring pressed detent.

Figure 9 is a horizontal sectional view taken through the lower part of Figure 2 approximately on the line 9—9.

Figure 10 is a vertical longitudinal sectional view through the stationary channel member and the movable guide member showing the springs operating therebetween.

Figure 11 is an elevational view looking into one of the movable guide members.

Figure 12 is a horizontal sectional view through one side of the window casement showing the arrangement of the sash guides and the position and manner of mounting of the stationary channel members.

Referring in detail to the drawings, wherein like numerals refer to like parts throughout the same, the numeral 5 refers generally to a conventional type of window casement which is provided with the three vertical strips, the front strip 6, the intermediate strip 7, and inner strip 8, the strips being spaced to constitute guides for the sashes (not shown). For a clear understanding of this arrangement reference is made to Figure 12, wherein it is shown that to the outward face of the strip 6 are secured by nails or screws tabs 9 which are struck out of one side of the stationary channel member 10 which fits into the position indicated in Figures 3 and 12. This manner of attachment places the web of the channel member 10 against the lateral face of the strip 6 as is also clearly indicated in these figures. It will be observed that the width of the channel member 10 is practically the same as that of the strip 6. As shown in Figure 10 the bowed springs 11 are secured in any suitable manner to the web of the channel member 10 to engage the web of the movable guide member which I have generally designated 12. It will also be noted in this figure that in the upper and lower end portions of the side walls of the channel member 10, I have provided horizontal slots 13, 14 to receive slidable tongues 15 and 16 on the movable guide member, whereby these members are adequately assembled together in telescoping manner, while the guide member is permitted within the limits defined by the length and position of the slots 13, 14 to move inwardly and outwardly with respect to the channel member 10. All of the structure described above is duplicated on the opposite side of the casement except that, of course, the position thereof is reversed.

The movable channel member 12 comprises a pressed metal form which is generally U-shaped in cross section and is made up by inner side members 17 whose outer side members 18 are joined to the inner side members by the bent portions 19. The outer side members 18 have an inwardly directed L-shaped extension 20. The bight portion of this guide member is constituted by portions 21 connected by a closed loop 22 forming a partition and adapted to act as a separator and guide for the screens or slides which are slidably related thereto in the positions indicated in Figure 3.

In each of the portions 21 which make up the bight portion of the guide member 12 and on the side thereof which faces the L-shaped portions 20 there is provided a vertically spaced series of dents 23, 24 respectively engageable by a ball detent 25 which is carried by each of the screens or slides, for the purpose of holding the slides in adjusted positions.

Each of the slides or screens, the upper one being generally designated 26 and the lower one 27, is formed as indicated particularly in Figures 2, 4 and 9. The frame portion of each screen or slide is composed of a pair of metal members of approximately the same gauge or thickness, but of different widths as clearly shown in Figures 4 and 9. One edge or side of the members 28, 29, forming the frame are flush, while the opposed edges or sides are offset to provide room for the roller 30 which is located in the resultant space to work between the portions 21, 20 of the guide member as shown in Figures 3 and 9.

The member 28 has therein a longitudinal groove 31 arranged to cooperate with a rib or tongue 32 similarly running longitudinally of the piece 29. The marginal portion of the screen material 33 is placed between the pieces 28, 29 so as to be clamped between these pieces by the engagement of the sides and the grooves 31 and the tongues 32 under the clamping action of the machine screw 34 which traverses the piece 28 and threads into the piece 29 as shown in Figure 4. A felt pad 35 is placed in the grooves 31 to give a better purchase on the screen material and at the same time prevent injury thereto.

Also placed between and clamped by the pieces 28, 29 in opposition to the screen material 33 is an L-shaped metallic member 36 which has its foot portion 37 engaged with the edge of the piece 28 as shown in Figure 9. A stub-shaft 38 carries the roller 30 in the position shown in Figure 9, the stub-shaft being anchored to the standard portion of the element 36. An opening in the foot portion 37 of this element smaller than the diameter of the ball detent 25 retains the ball detent in the recess 39 wherein is located a spring 40 for forcing the ball detent outwardly, and a cup 41 is interposed between the spring 40 and the ball detent to resist the friction and wear resulting from the turning of the ball detent. It will be observed that the roller 30 extends slightly beyond the outer face of the foot portion 37, while the ball detent 25 extends still farther from the outer surface of the foot portion 37 so as to be normally outward of the roller 30. This arrangement is provided so that the ball detent will normally be constantly engaged with the web of the guide member and its dents, while the roller 30 may be free and out of contact with one or both of the guide surfaces provided by the portions 21, 20 of the guide member, to permit easy action of the screens or slides. Thus, the only resistance present to the free shifting vertically of the slides or screens resides in the comparatively negligible resistance provided by the engagement of the ball detents with the dents in the guide member, which, however, is adequate to maintain the slides or screens in adjusted positions until changed.

It will be observed that as shown in Figure 2 each screen or slide comprises the screen material 33 and the frame member composed of the pieces 28, 29, and that each piece 28, 29 is bent into the form of a square open only at the diagonal breaks 42, 43 respectively, which are placed in opposed relation so that an unbroken part of the element 28 is opposed to the broken part of the element 29. When assembling the pieces they are bent into the square form indicated and the diagonal cut ends brought together in the manner stated and the elements then secured together by the screws 34 already mentioned, so that the L-shaped members 36 and the marginal portions of the screen material are properly clamped in their appointed positions.

Openings 44, 45 are provided in the portions 20 of the guide member to admit the rollers on the two screens or slides, and to make it possible to assemble the screens or slides with the guide member in such a way that the screens cannot subsequently be separated therefrom when the screen structure is in place in the window, withdrawal of the screens from the guide member being possible only by disassembling the parts after removing the same from the window casement and withdrawing the rollers through openings 44, 45 after sliding the frame in the proper manner relative to the guide member.

The device described herein is the only one known to me which is capable of application to the casement type of windows and which will function adequately in such an arrangement without occupying an excessive amount of space, wherein two independently movable screens or slides are provided. It will also be noted that the springs 11 permit self aligning of the entire structure to the window casement.

I have found that constructing the device of my invention of proper sheet metal provides a device which is lower in manufacturing and material cost than an equivalent structure constructed of wood, and at the same time gives the advantages of very much less bulk, enabling inexpensive shipment, inconspicuousness after installation, and mechanical perfection. The device of the invention in no way interferes with the ordinary operation of the sashes of the window, and as already mentioned, the screens or slides of the device are operable and adjustable independently of each other. An idea of the comparative size and bulk of the device may be gained from Figure 12 wherein the width of the main or stationary channel member is shown to be approximately that of the ordinary sash guide forming strip 6. It would not be possible to provide an adequately strong device of this character within such small dimensions utilizing wood or similar material in its construction. It is believed that the maximum compactness consistent with strength has been achieved by me and that I provide a very distinct improvement by this arrangement. It will be also noted that my device eliminates the necessity for the use of two independent screen units in a casement type of window and provides for the installation of a single unit which carries the two individual independently operable screens or slides without providing the bulky arrangement which has heretofore been necessarily a part of providing independent screens for the casement type of window. My invention may be mounted in the casement window opening at any desired distance outwardly of the outwardly swinging windows so as to clear the hardware usually employed with this type of window and permit opening and closing of the windows without interference from the screens.

Although I have shown and described herein a preferred embodiment of my invention, it is to be definitely understood that I do not desire to limit the application of the invention thereto, but any change or changes may be made in material, construction and arrangement of parts, such as altering the same in some conventional manner to apply the same to vehicle windows and forms of windows other than that shown herein, within the spirit of the invention and the scope of the subjoined claims.

Having thus described my invention, what I claim as new is:

1. A stationary channel fixed to one side of and facing the opposite side of a window, a movable channel guide in and movable inwardly and outwardly relative to the web of said stationary channel, spring means interposed therebetween for pressing the guide channel toward the opposite side of the window, a pair of vertical chambers in said movable guide, a screen vertically slidable in each of said chambers, said stationary channel and said movable guide extending the full height of said window, and said screens being slidable relative to and independently of each other.

2. For use with a casement type window, a stationary channel fixed to one side of and facing the opposite side of the window, a movable channel guide in and movable inwardly and outwardly relative to the web of said stationary channel, spring means interposed therebetween for pressing the guide channel toward the opposite side of the window, a pair of vertical chambers having depressions therein in said movable guide, a screen vertically slidable in each of said chambers, said stationary channel and said movable guide extending the full height of said window, and said screens being slidable relative to and independently of each other, and spring detent means carried by a portion of each of said screens and engageable with said depressions provided in said chambers for holding said screens in vertically adjusted positions.

3. A stationary channel fixed to one side of and facing the opposite side of a window, a movable channel guide in and movable inwardly and outwardly relative to the web of said stationary channel, spring means interposed therebetween for pressing the guide channel toward the opposite side of the window, a pair of vertical chambers in said movable guide, a screen vertically slidable in each of said chambers, said stationary channel and said movable guide extending the full height of said window, and said screens being slidable relative to and independently of each other, and spring detent means carried by a portion of each of said screens and engaging with depressions provided in said chambers for holding said screens in vertically adjusted positions, and a roller on each screen and engageable with either of two opposed walls of the respective chamber.

4. In a slidable window screen structure including a stationary channel and a guide member supported thereby, a chamber on said guide including a pair of opposed walls, a screen having a marginal portion slidable in said chamber, a laterally carried roller on said marginal portion and arranged between said opposed walls and engageable with one of said walls at a time, said roller holding said marginal portion engaged with said guide and preventing withdrawal thereof.

5. In a slidable screen structure of the type described, a screen comprising a pair of frame forming members, means clamping said members together, a reticulated member clamped therebetween, a bracket member also clamped therebetween, a roller carried by said bracket, a detent retained by said bracket, a guide member with which said roller and detent are engaged, each of said pair being bent into the form of a rectangle.

6. In a slidable screen structure including a guide having detent receiving dents therein and a screen having an edge portion slidable therein, an outwardly spring pressed ball engaging said dents in said guide for retaining the screen in vertically adjusted positions.

7. In a structure of the class described, a movable guide channel having extensions directed outwardly from the web thereof in a direction opposite to that in which the sides extend and being of L-shaped form, a partition extending in the last-mentioned direction from the web of the movable guide and between the L-shaped extensions, and a pair of relatively slidable screens in side by side relation, each of said screens having a portion sliding against a side of said partition and carrying a laterally positioned roller confined by the foot portion of the respective L-shaped extensions and rolling thereon and on a portion of the web of the movable guide opposite said foot portion, and a stationary channel fixed on one side of a window frame and receiving and supporting the sides of the movable guide channel.

8. In a structure of the class described, a movable guide channel having extensions directed outwardly from the web thereof in a direction opposite to that in which the sides extend and being of L-shaped form, a partition extending in the last-mentioned direction from the web of the movable guide and between the L-shaped extensions, and a pair of relatively slidable screens in side by side relation, each of said screens having a portion sliding against a side of said partition and carrying a laterally positioned roller confined by the foot portion of the respective L-shaped extensions and rolling thereon and on a portion of the web of the movable guide opposite said foot portion, and a stationary channel fixed on one side of a window frame and receiving and supporting the sides of the movable guide channel, the sides of the movable guide channel sliding within and on the sides of the stationary channel toward and away from the said side of the window frame.

GUSTAVE B. YALCH.